US007002336B2

(12) United States Patent
Leonard et al.

(10) Patent No.: US 7,002,336 B2
(45) Date of Patent: Feb. 21, 2006

(54) TEST ADAPTER FOR A WEAPON STORE TEST SET

(75) Inventors: James V. Leonard, St. Charles, MO (US); Allan W. Nelson, O'Fallon, MO (US); Patrick F. Dudenhoeffer, Wentzville, MO (US); Todd J. Palmer, Lake St. Louis, MO (US); Richard E. Meyer, Florissant, MO (US)

(73) Assignee: The Boeing Company, Chicago, IL (US)

( * ) Notice: Subject to any disclaimer, the term of this patent is extended or adjusted under 35 U.S.C. 154(b) by 258 days.

(21) Appl. No.: 10/424,948

(22) Filed: Apr. 28, 2003

(65) Prior Publication Data

US 2005/0030006 A1 Feb. 10, 2005

(51) Int. Cl.
*G06F 17/00* (2006.01)

(52) U.S. Cl. .................................. 324/158.1; 324/73.1

(58) Field of Classification Search .............. 324/73.1, 324/158.1; 701/3
See application file for complete search history.

(56) References Cited

U.S. PATENT DOCUMENTS

| | | | | | |
|---|---|---|---|---|---|
| 4,549,277 | A | * | 10/1985 | Brunson et al. | 702/154 |
| 4,580,987 | A | * | 4/1986 | Walden | 441/25 |
| 4,608,531 | A | * | 8/1986 | Stephens | 324/73.1 |
| 4,825,151 | A | * | 4/1989 | Aspelin | 324/73.1 |
| 4,996,520 | A | * | 2/1991 | Williams et al. | 340/662 |
| 5,034,686 | A | * | 7/1991 | Aspelin | 324/537 |
| 5,077,671 | A | * | 12/1991 | Leslie et al. | 701/3 |
| 5,079,707 | A | * | 1/1992 | Bird et al. | 701/35 |
| 5,111,402 | A | * | 5/1992 | Brooks et al. | 701/35 |
| 5,359,331 | A | * | 10/1994 | Adler | 342/124 |
| 5,548,510 | A | | 8/1996 | Ebert et al. | |
| 5,591,031 | A | * | 1/1997 | Monk et al. | 434/14 |
| 5,635,662 | A | * | 6/1997 | Robertson et al. | 89/1.11 |
| 5,903,146 | A | * | 5/1999 | Wang | 324/158.1 |
| 5,931,874 | A | | 8/1999 | Ebert et al. | |
| 5,992,290 | A | * | 11/1999 | Quebedeaux et al. | 89/1.56 |
| 6,122,569 | A | | 9/2000 | Ebert et al. | |
| 6,152,011 | A | * | 11/2000 | Ivy et al. | 89/1.814 |
| 6,349,898 | B1 | | 2/2002 | Leonard et al. | |
| 6,615,116 | B1 | * | 9/2003 | Ebert et al. | 701/3 |
| 6,763,289 | B1 | * | 7/2004 | Leonard et al. | 701/3 |

OTHER PUBLICATIONS

U.S. Appl. No. 10/796,218, filed May 9, 2004, Eggemeyer et al.

* cited by examiner

*Primary Examiner*—Paresh Patel
(74) *Attorney, Agent, or Firm*—Thomspon Coburn LLP

(57) ABSTRACT

A method and apparatus for testing the electrical power system of an aircraft uses existing unmodified test equipment not otherwise capable of reliably testing and certifying the aircraft for weapon store launching operations for a particular store type.

31 Claims, 4 Drawing Sheets

TEST ADAPTER FOR A WEAPON STORE TEST SET

This invention was developed in the course of work under U.S. government contract N00019-G-97-0119. The U.S. government may possess certain rights in the invention.

FIELD OF THE INVENTION

The present invention relates generally to a test method and apparatus and, more particularly, to a test method and apparatus for testing the electrical power system of an aircraft using existing unmodified test equipment not otherwise capable of properly testing and certifying the aircraft for store launching operations for the particular store type.

BACKGROUND OF THE INVENTION

Modern aircraft, such as an F-15E aircraft manufactured by the assignee of the present invention, and the P-3, the S-3 and the F-16 aircraft manufactured by Lockheed Aeronautical Systems Company, are adapted to carry stores. These stores can, for example, include missiles, such as the Joint Direct Attack Munition (JDAM), the Walleye missile, the Standoff Land Attack missile (SLAM), the SLAM-ER missile, the Harpoon missile, and the Maverick missile. A missile is generally mounted to the wing of a host aircraft, typically via disconnectable pylons, such that the aircraft can carry the missile to the vicinity of the target destination prior to its deployment.

Prior to uploading the store to the aircraft pylon, the aircraft and its provisioning for the store must be tested and certified to be within the specifications for acceptable store launching operation. To perform these preinstallation certification tests, ground support test equipment are deployed with the aircraft for the purpose of testing the aircraft via the Pylon Store Interface Cable Connector. For example the ground support test set for the P-3 aircraft includes the AWM 96 Test Set which has the capability of testing the electrical performance of every circuit in the aircraft-to-store interface cable. This includes testing for proper voltage, frequency, power, timing, and wiring impedance. Discrete signal conductors are tested to insure adequate voltage magnitude and timing. Communication signals are tested for bi-directional transmission and proper protocol. Additional tests verify the ability of the aircraft to provide safety logic and assure that weapon launch and abort functions are operating correctly.

To certify the readiness of the aircraft for weapon store upload and interconnections, the ground test equipment must be precertified as operational. This is assured through proper design and configuration control as well as periodic testing of the ground support equipment itself. Once certified, the ground support equipment can only be changed using costly formal change programs involving lengthy schedule time.

Aircraft, such as the P-3, for example, can be equipped to carry additional weapons, not included in the stores inventory, by adding functions in cable modules and in the umbilical cable wiring between the weapon store and the aircraft pylon connector. Adding functions to the aircraft wiring and weapon umbilical cable allows the aircraft and its existing weapon system to remain unchanged while expanding the weapon store inventory to include additional store types. An example of this is the addition of the SLAM-ER weapon to the P-3 aircraft equipped with the Harpoon weapon system. The SLAM-ER weapon requires special power characteristics and timing not included in the Harpoon weapon system. To achieve the SLAM-ER power compatibility with the P-3 aircraft and its Harpoon weapon system, a special umbilical cable that includes power-switching relays may be added between the aircraft pylon connector and the SLAM-ER weapon store. This cable allows the existing Harpoon weapon system control panel switch functions in the P-3 aircraft to use the Harpoon power sources and logic functions to initiate the power sequences required by MIL-STD 1760 for the SLAM-ER missile launch cycle. However, prior to uploading a SLAM-ER weapon onto the aircraft pylon, the aircraft and its Harpoon weapon system with the SLAM-ER weapon umbilical cable must be certified for the SLAM-ER weapon store.

The test equipment used to certify the P-3 aircraft and Harpoon Weapon system for MIL-STD 1760 SLAM-ER Weapon launching is the AWM 96 Ground Support Test Set. This test set connects directly to the aircraft-to-missile umbilical connector and either certifies the aircraft and its weapon control system to be within specifications for launching a weapon, or rejects the aircraft as non-serviceable. The AWM 96 Test Set includes tests of the source voltages and source impedances required for the MIL-STD 1760 weapon, but the "Go/No-Go" limits are inadequate for the SLAM-ER. That is, the AWM 96 Test Set could certify the aircraft and SLAM-ER weapon system as in specification or a "Go" condition with insufficient source voltage and/or too high of source impedance to successfully launch a SLAM-ER weapon store. For example, the SLAM-ER weapon requires the aircraft to supply DC # 2 open circuit voltage of 26.5 volts and a source impedance of 0.75 ohms, whereas the existing AWM 96 Test Set accepts open circuit voltage of 22 volts and 1.0 ohm source impedance as an acceptable or "Go" test result. The lower voltage and higher impedance allowed by the test set measurement would not assure adequate power delivered to the weapon loads, and therefore would erroneously certify the aircraft for SLAM-ER weapon upload.

SUMMARY OF THE INVENTION

The method and apparatus of this invention utilizes an electrical circuit test adapter connected in the wiring between the aircraft-to-missile umbilical cable and the test set used to certify the aircraft and its weapon store to provide translation of source voltage and source impedance such that the test set provides reliable test results without expensive and time consuming modifications to the test set. In accordance with a preferred embodiment of the invention, the method and apparatus of this invention utilizes an electrical circuit test adapter connected in the wiring between the P-3 aircraft-to-missile umbilical cable and AWM 96 Test Set, and provide a translation of the source voltage and source impedance of the aircraft such that the acceptable limit values of the SLAM-ER weapon specifications correspond to the MIL-STD 1760 weapon preset "Go/No-Go" limits of the AWM 96 Test Set. In this preferred embodiment, inserting the apparatus of the present invention between the aircraft-to-store umbilical cable and the AWM 96 Test Set assures that the aircraft's open circuit source voltage is greater than 26.5 volts and source impedance is lower than 0.75 ohms if the test results in the "Go" condition. Similarly, the method and apparatus of the present invention provides for translation of the DC #1 voltage and source impedance such that the AWM 96 "Go" test result certifies both the DC #1 and DC #2 power sources for the SLAM-ER weapon. Therefore, in accordance with a preferred embodiment of the present invention, the method and apparatus of this invention provide for certification of the P3-C aircraft and weapon system as serviceable for SLAM-ER weapon application, using the existing AWM 96 Test Set without the expensive cost and lengthy delays required for test set modification.

Moreover, the AWM 96 Test Set includes preset power sequencing required for the MIL-STD 1760 weapon that is inadequate for the SLAM-ER certification test. The method and apparatus of this invention includes switches in the 3 phase AC power circuit, the DC #1 and DC #2 power circuits, and the release and separation circuits. These switches allow complete launch cycle sequence testing by manually controlling sequencing of power, in conjunction with manual control of the AWM 96 Test Block, to satisfy the SLAM-ER power time line test requirements and the sequencing of release consent and weapon store separation to exercise and satisfy SLAM-ER launch logic.

Thus, the apparatus and method of the present invention utilize a test adaptor for testing the electrical power system of the aircraft, having a weapon store umbilical cable, utilizing a test set to determine whether electrical parameters of the aircraft satisfy predetermined standards for store launching operations. An electrical circuit of the adaptor translates electrical parameters to be tested of the aircraft, such that detection of the translated parameters by the test set provides reliable certification for store weapon launching operations.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
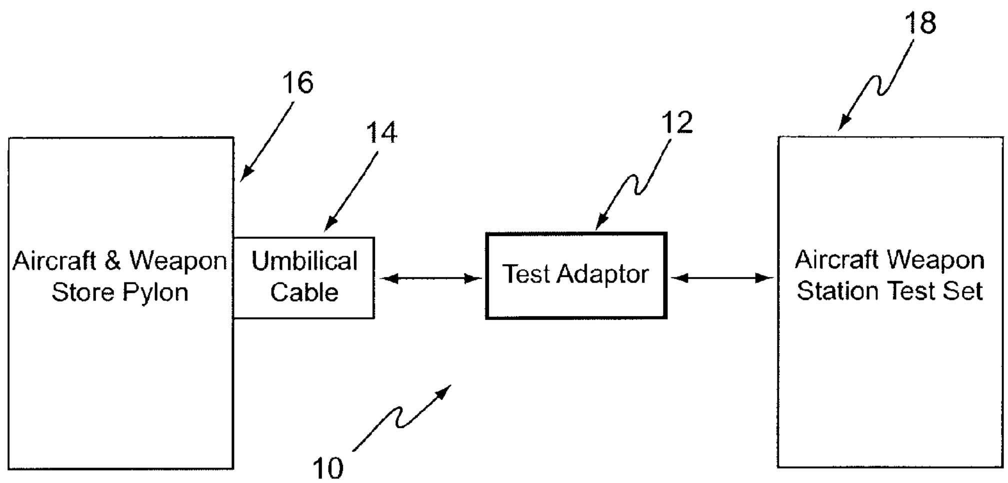
FIG. 1 is a general block diagram illustrating a preferred embodiment of the method and apparatus of the present invention.

With reference to the drawings there is shown in FIG. 1 an apparatus 10 in accordance with a preferred embodiment of the present invention. The apparatus 10 includes a test adapter 12 connected between an umbilical cable 14, connected to an aircraft and weapon store pylon 16, and an aircraft weapon station test set 18. In accordance with a preferred embodiment of the invention, the test set may be an AWM 96 Test Set well known to those skilled in the art used for certifying the readiness of an aircraft for weapon store launching operations, including readiness of the aircraft for weapon store upload and interconnections with the aircraft. The AWM 96 Test Set is particularly adapted for testing the readiness of the aircraft for store loading operations of a MIL-STD 1760 missile store on a P-3 aircraft. However, it is to be understood that the present invention is not so limited, but rather is applicable to other test sets, aircraft, and store types. Thus, the aircraft and weapon store pylon 16 and umbilical cable 14 may be that of a P-3 aircraft, but could also be the umbilical cable of other aircraft and still be within the scope of the present invention.

The umbilical cable 14 may be an umbilical cable module connected to the aircraft pylon 16 to enhance the capability of the aircraft to launch additional store types while allowing the aircraft and its existing weapon system to remain unchanged. For example, the P-3 aircraft originally equipped for a Harpoon weapon system may be modified by the addition of the umbilical cable adapter 14 to expand the aircraft's capability to launch a SLAM-ER weapon system. Once installed, the umbilical cable 14 becomes part of the aircraft and weapon store pylon 16. While the umbilical cable 14 may be of a type to enhance the capability of a P-3 aircraft to launch additional store types, such as the SLAM-ER missile, it is to be understood that the umbilical cable 14 need not be specific to any particular aircraft or any particular store type.

The test adapter 12 of the present invention functions as a translation module for translating electrical power parameters, to be tested by the test set 18, of the aircraft such that detection of the translated parameters by the test set provides reliable certification for store weapon launching operations, even though the test set, without the test adapter 12, cannot reliably certify the readiness of the aircraft for store launching operations for the particular store type. For example, in accordance with a preferred embodiment, the test set 18 may be an AWM 96 Test Set for certifying the readiness of a P-3 aircraft for store launching operations of a MIL-STD 1760 missile. If the P-3 aircraft is modified to provide launch capability for a SLAM-ER missile, the test set 18 without the adapter of the present invention cannot provide reliable certification. This is because the electrical power parameters that must be certified in accordance with MIL-STD 1760 must satisfy different standards for the SLAM-ER missile than for a typical MIL-STD 1760 missile. More specifically, the open circuit source voltage parameter for the aircraft electrical power system for the MIL-STD 1760 missile must be at least 22 volts, while for the SLAM-ER missile it must be at least 26.5 volts. The source impedance for the electrical power system for the MIL-STD 1760 missile must be no greater than 1 ohm, while for the SLAM-ER missile it must be no greater than 0.75 ohms. Thus, use of the AWM 96 Test Set designed to certify the MIL-STD 1760 missile for launching operations could, without the test adapter 12, erroneously certify the aircraft for SLAM-ER missile operations upon detecting an open circuit source voltage of less than 26.5 volts and/or a source impedance of greater than 0.75 ohms. Thus, the test adapter 12 translates the electrical power parameters to be tested by the test set 18, of the aircraft such that detection of the translated parameters by the test set provides reliable certification of the aircraft for store launching operations.

Figure 2:
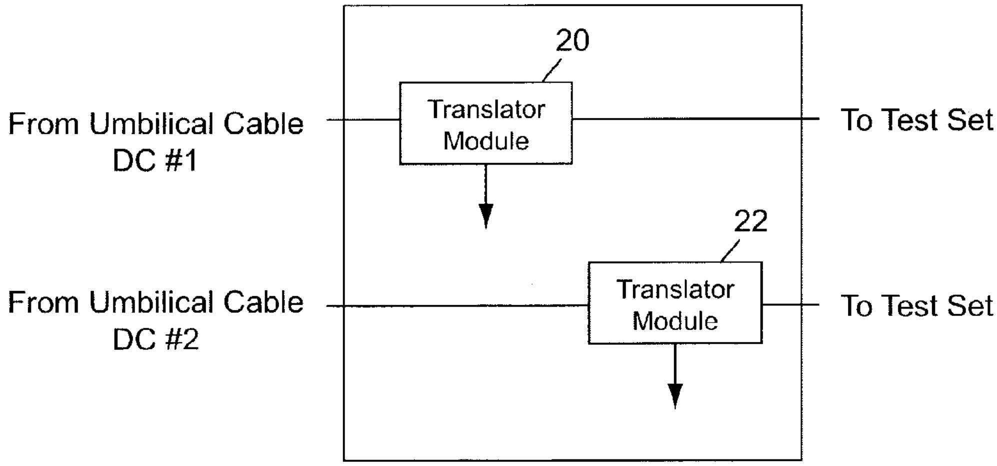
FIG. 2 is a block diagram illustrating a preferred embodiment of the test adapter translation module of the present invention.

FIG. 2 further illustrates the test adapter 12 with individual translator modules 20, 22 in the DC #1 and DC #2 power circuits, respectively, of the SLAM-ER umbilical cable. Thus, the translator module applies to both the DC #1 and DC #2 voltage and source impedance such that the AWM 96 Test Set can certify both the DC #1 and DC #2 power sources for the SLAM-ER weapon.

Figure 5:
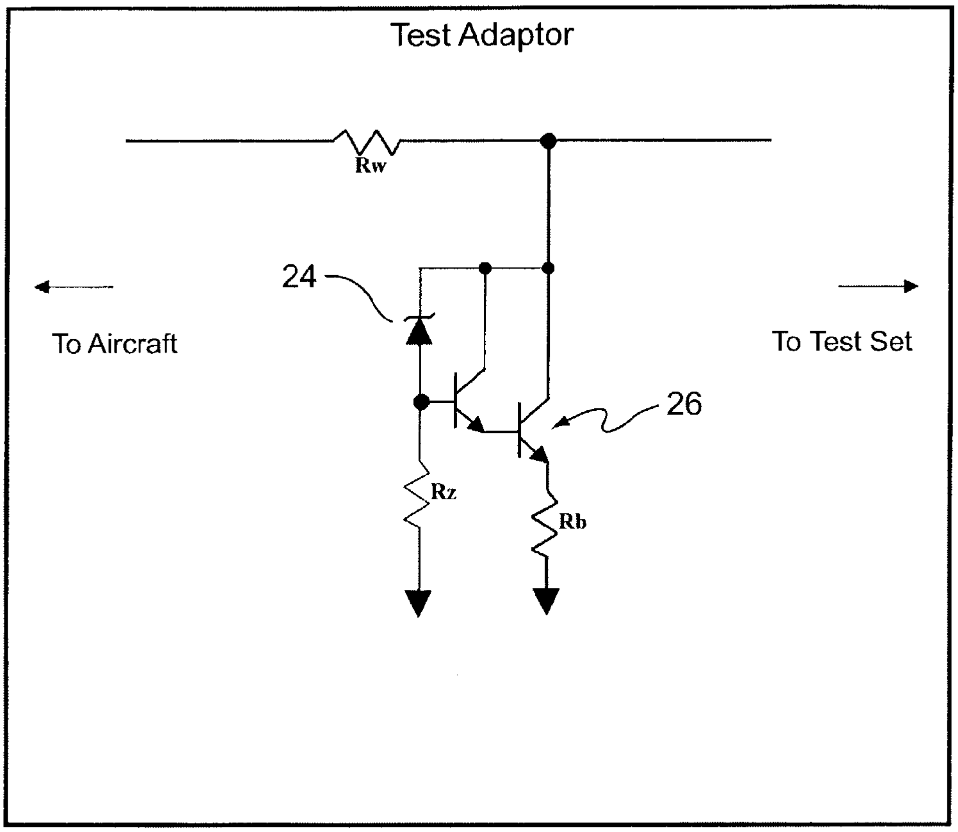
FIG. 5 is an electrical schematic of a translator module in accordance with a preferred embodiment of the present invention.

FIG. 5 illustrates an example of a circuit for each of the translator modules 20, 22. The circuit includes resistors Rb and Rw, a resistor Rz, a Zener diode 24, and a Darlington transistor pair 26. The resistors Rb and Rw may be selected to yield the desired or test limit impedance when modeled in the total circuit that includes the aircraft source voltage and wiring impedance and the AWM 96 Test Set load impedance and measurement point. The Zener diode 24, resistor Rz, and Darlington transistor pair 26 comprise an equivalent voltage source sized to combine with the aircraft source voltage, reflected through the resistor network, to yield the test limit value of the test set when the aircraft source voltage is at limit value. The resistors Rb and Rw, the open circuit voltage of the aircraft, and the test limit value of the measured voltage of the AWM 96 Test Set can be used to determine the value of the combined Zener diode voltage and base to emitter voltages of the two transistors of the Darlington pair. The value of Rz is selected to maintain the Zener diode current at the test value less the base current into the Darlington pair.

Figure 6:
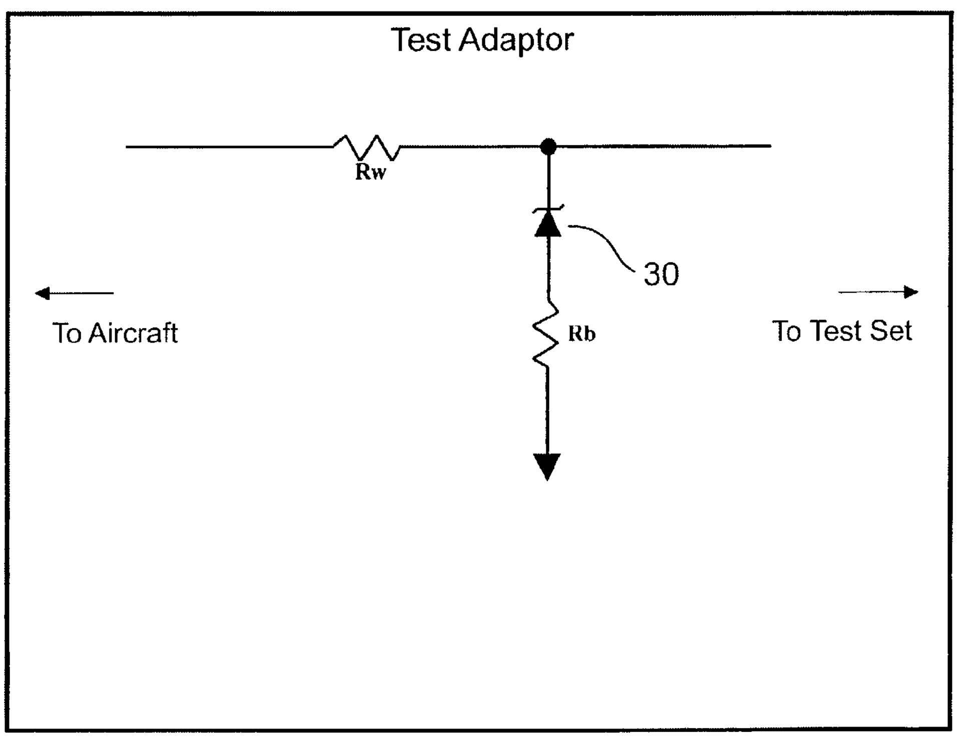
FIG. 6 is an electrical schematic of a translator module in accordance with a preferred embodiment of the present invention.

FIG. 6 illustrates a variation of the circuit in FIG. 5 where the Darlington transistor pair 26, Zener diode 24, and resistor Rz are replaced with a power Zener diode 30 as an equivalent voltage source capable of dissipating large amounts of power and having the voltage rating determined for the Zener diode 24 and the two base to emitter voltages of the Darlington pair in FIG. 5.

Figure 7:
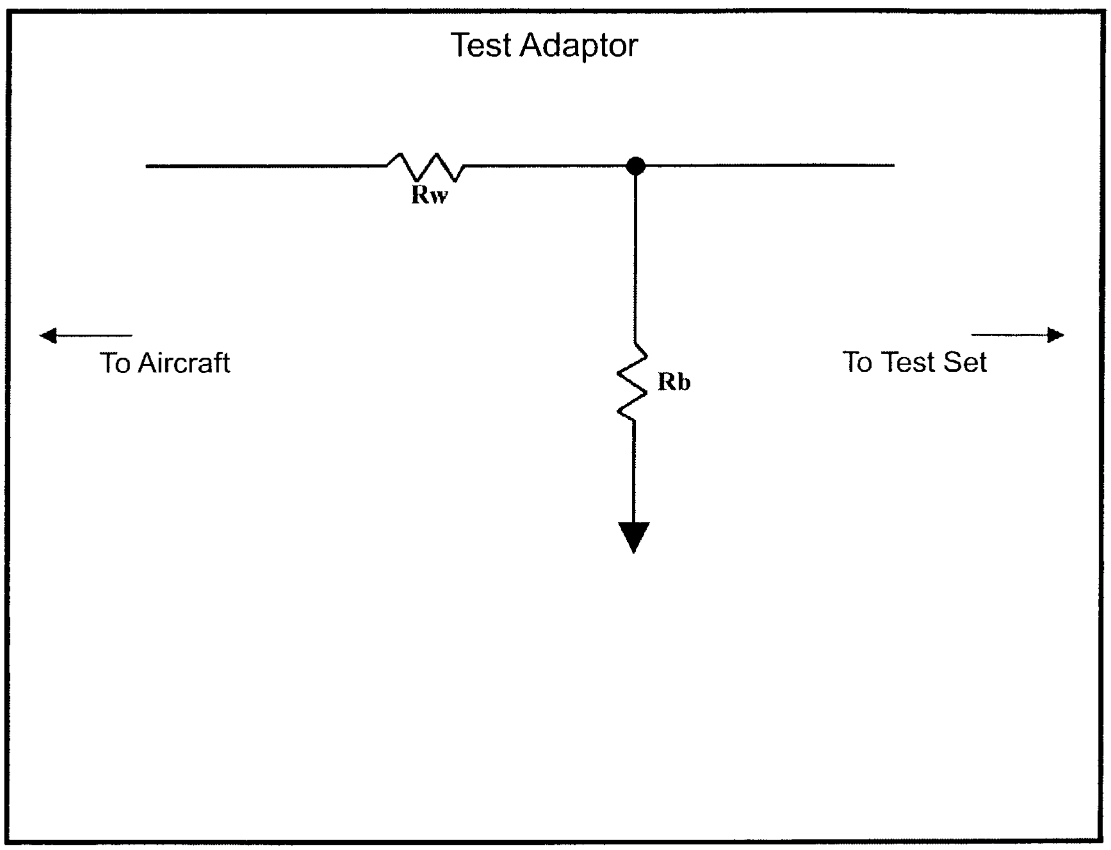
FIG. 7 is an electrical schematic of a translator module in accordance with a preferred embodiment of the present invention.

FIG. 7 illustrates another circuit for the translator module for use where the open circuit voltage of the aircraft is not a concern. The circuit of FIG. 7 includes resistors Rw and Rb, connected as shown, to translate the aircraft wiring impedance for detection by the test set to assure reliable certification of the aircraft impedance for store launching operations.

Figure 3:
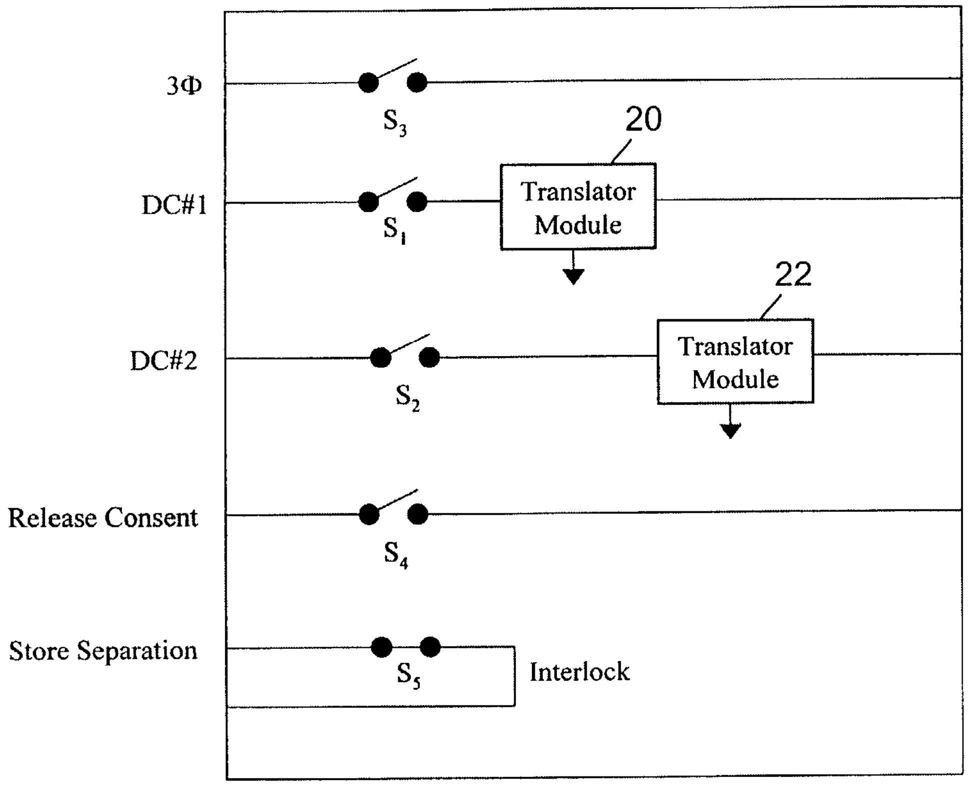
FIG. 3 is a block diagram illustrating a further preferred embodiment of the apparatus and method of the present invention.

In addition to testing for proper aircraft source voltage and source impedance, the test adapter of the present invention also provides for launch cycle sequence testing. While the AWM 96 Test Set could test for the preset power sequencing for the MIL-STD 1760 weapon, it was inadequate for testing preset power sequencing for the SLAM-ER weapon. The test adapter of the present invention allows for complete launch cycle sequence testing of the SLAM-ER missile without modification of the AWM 96 Test Set. With reference to FIG. 3, the test adapter 12 includes switches S1-S5 connected as shown in the three-phase AC power circuits, the circuits for the DC #1 and DC #2 power, and the release and separation circuits from the aircraft. These switches, in conjunction with manual selection of the AWM 96 test block, allow complete launch cycle sequence testing by manually controlling sequencing of the power to satisfy the SLAM-ER power timeline test requirements and the sequencing of release consent and weapon store separation to exercise and satisfy SLAM-ER launch logic.

Figure 4:
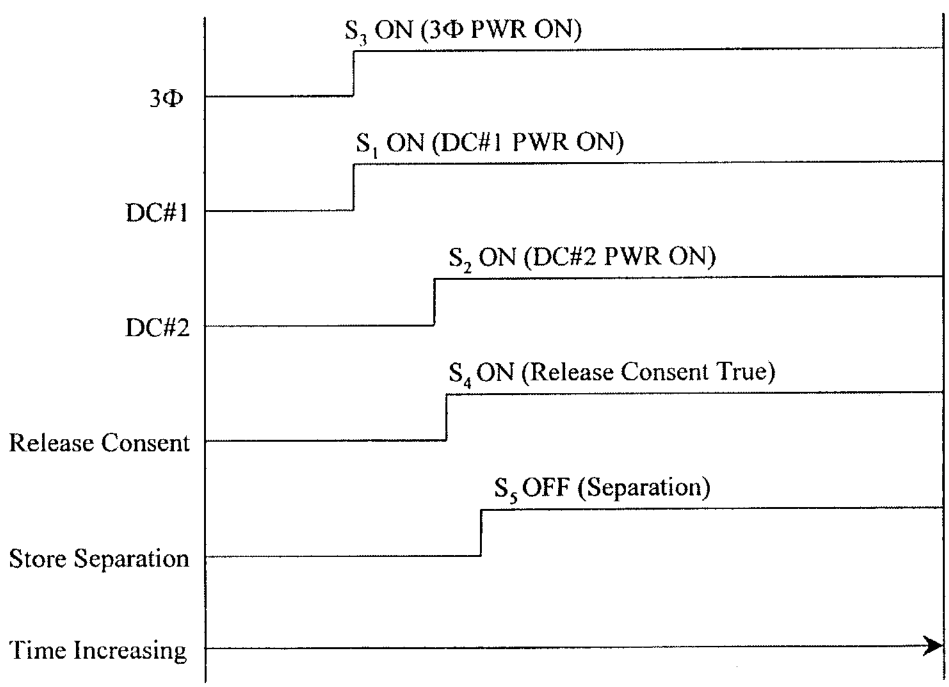
FIG. 4 is a timing chart for operation of the switches illustrated in FIG. 3.

FIG. 4 illustrates the sequence of the SLAM-ER launch operations. The three-phase power switch S3 and DC #1 power switch S1 are first closed to simulate the power-up and self test activities within the SLAM-ER weapon. Next, the DC #2 power is applied by closing switch S2, which is closely followed by closing switch S4 to simulate the initiation of SLAM-ER launch functions. Next, switch S5 is opened to simulate SLAM-ER weapon separation from the aircraft store umbilical cable and initiation of final portions of the launch cycle.

Thus, there has been described a method and apparatus for testing the electrical power system of an aircraft using existing unmodified test equipment not otherwise capable of properly testing and certifying the aircraft for store launching operations for the particular store type.

While the present invention has been described by reference to specific embodiments and specific uses, it should be understood that other configurations and arrangements could be constructed, and different uses could be made, without departing from the scope of the invention as set forth in the following claims.

What is claimed is:

1. A test adapter for testing the electrical power system of an aircraft, having a weapon store umbilical cable, utilizing a test set to determine whether electrical power parameters of the aircraft satisfy predetermined standards for store launching operations, said adapter comprising:

an electrical circuit connected between the aircraft weapon store umbilical cable and the test set, said electrical circuit translating electrical power parameters, to be tested, of the aircraft, such that detection of the translated parameters by the test set provides reliable certification for store weapon launching operations.

2. The test adapter of claim 1 wherein the aircraft is a P-3 aircraft, and the test set is an AWM 96 Test Set.

3. The test adapter of claim 2 wherein said standards are in accordance with MIL-STD 1760.

4. The test adapter of claim 1 wherein a parameter tested is the aircraft source voltage required for store launching operations.

5. The test adapter of claim 1 wherein a parameter tested is the aircraft source impedance required for store launching operations.

6. The test adapter of claim 2 wherein the parameters tested include aircraft source voltage and source impedance.

7. The test adapter of claim 6 wherein a source voltage of at least about 22 volts detected by said AWM 96 Test Set provides reliable certification of aircraft source voltage of at least about 26.5 volts.

8. The test adapter of claim 6 wherein an impedance of no greater than about 1 ohm detected by said AWM 96 Test Set provides reliable certification of a aircraft source impedance not greater than about 0.75 ohms.

9. The test adapter of claim 1, said electrical circuit further comprising switches, said switches being operable to provide launch cycle sequence testing.

10. The test adapter of claim 9 wherein said electrical circuit further comprises switches in the three-phase AC power circuit, the DC #1 and DC #2 circuits, and the release and separation circuits of the aircraft.

11. The test adapter of claim 2 wherein said store is a SLAM-ER missile.

12. A test adapter for testing the electrical power system of an aircraft, having a weapon store umbilical cable, utilizing an AWM 96 Test Set to determine whether electrical power parameters of the aircraft satisfy MIL-STD 1760 standards for store launching operations, said adapter comprising:

an electrical circuit connected between the aircraft weapon store umbilical cable and the AWM 96 Test Set, said electrical circuit translating electrical power parameters, to be tested, of the aircraft such that detection of the translated parameters by the AWM 96

Test Set provides reliable certification for store weapon launching operations, said parameters being tested including source voltage and source impedance.

13. The test adapter of claim 12 further comprising switches, said switches being operable to provide launch cycle sequence testing.

14. The test adapter of claim 13 wherein said electrical circuit further comprises switches in the three-phase AC power circuit, the DC #1 and DC #2 circuits, and the release and separation circuits of the aircraft.

15. A test adapter for use in testing the electrical power system of an aircraft, having a weapon store umbilical cable, utilizing a test set, said test set pre-certified as operational to certify the readiness of the aircraft for weapon store launching operations with respect to a first weapon store, to certify the readiness of the aircraft for weapon store launching operations of a second weapons store having different certification standards for electrical power parameters than the first weapons store, said adapter comprising:

an electrical circuit connected between the aircraft weapons store umbilical cable and the test set, said electrical circuit translating the aircraft electrical power parameters to be tested, such that detection of the translated parameters by the test set provides reliable certification for store weapon launching operations of the second store.

16. The test adapter of claim 15 wherein the test set is an AWM 96 Test Set.

17. The test set of claim 16 wherein said first store is a MIL-STD 1760 missile, and said second store is a SLAM-ER missile.

18. The test adapter of claim 15 wherein the parameters tested include aircraft source voltage and source impedance.

19. An apparatus for testing the electrical power system of an aircraft to certify the readiness of the aircraft for weapon store launching operations, said apparatus comprising:

a weapon store umbilical cable connected within the electrical power system of said aircraft;

a test set pre-certified as operational to certify the readiness of the aircraft for weapon store launching operations of a first weapon store, and an electrical circuit connected between the aircraft weapons store umbilical cable and the test set, said electrical circuit translating electrical power parameters to be tested of the aircraft such that detection of the translated parameters by the test set provides reliable certification for weapon store launching operations of a second store having certifying standards for said electrical power parameters that differ from the certifying standards for said electrical power parameters for said first store.

20. The apparatus of claim 19 wherein said test set is an AWM 96 Test Set.

21. The test apparatus of claim 19 wherein said parameters tested include aircraft source voltage and source impedance.

22. The test apparatus of claim 19 wherein said electrical circuit further comprises switches, said switches being operable to provide launch cycle sequence testing.

23. The test apparatus of claim 19 wherein said first store is a MIL-STD 1760 missile and said second store is a SLAM-ER missile.

24. The test apparatus of claim 21, wherein said electrical circuit further comprises a resister circuit connected to translate the aircraft wiring impedance for detection by the test set to assure reliable certification of the aircraft impedance for store launching operations.

25. The test apparatus of claim 24, wherein said electrical circuit further comprises an equivalent voltage source sized to combine with the aircraft source voltage to translate the aircraft source voltage for detection by the test set to assure reliable certification of the aircraft source voltage for store launching operations.

26. A method of certifying the readiness of an aircraft for weapons store launching operations, said method comprising the steps of:

providing a test set pre-certified as operational to certify the readiness of said aircraft for weapons store launching operations of a first store;

connecting an electrical circuit between the electrical power system of said aircraft and said test set, said electrical circuit translating the aircraft electrical power parameters to be tested, such that detection of the translated parameters by the test set provides reliable certification for store weapon launching operations of a second store, and operating said test set to determine the readiness of the aircraft for weapons store launching operations of said second store.

27. The method of claim 26 wherein the parameters tested include aircraft source voltage and source impedance.

28. The method of claim 26 wherein said test set is an AWM 96 Test Set.

29. The method of claim 28 wherein said operating step further comprises operating said test set to determine whether electrical power parameters of the aircraft satisfy standards for store launching operations in accordance with MIL-STD 1760.

30. The method of claim 29 wherein said first store is a MIL-STD 1760 missile and said second store is a SLAM-ER missile.

31. The method of claim 26 wherein said electrical circuit further comprises switches, and said method further comprising the step of operating said switches to provide launch cycle sequence testing.

* * * * *